(12) United States Patent
Nies

(10) Patent No.: US 8,047,799 B2
(45) Date of Patent: Nov. 1, 2011

(54) WIND TURBINE BLADES WITH IMPROVED BOND LINE AND ASSOCIATED METHOD

(75) Inventor: Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/966,173

(22) Filed: Dec. 13, 2010

(65) Prior Publication Data

US 2011/0211969 A1    Sep. 1, 2011

(51) Int. Cl.
*F03D 11/00* (2006.01)
(52) U.S. Cl. ......................................... 416/232
(58) Field of Classification Search .................. 416/232
See application file for complete search history.

(56) References Cited

U.S. PATENT DOCUMENTS

| | | | |
|---|---|---|---|
| 6,800,956 B2 | 10/2004 | Bartlett | |
| 2007/0036659 A1 | 2/2007 | Hibbard | |
| 2008/0075603 A1* | 3/2008 | Van Breugel et al. | 416/232 |
| 2009/0226702 A1* | 9/2009 | Madsen et al. | 428/317.1 |
| 2010/0247325 A1* | 9/2010 | Stewart | 416/243 |
| 2011/0142663 A1* | 6/2011 | Gill | 416/226 |

* cited by examiner

*Primary Examiner* — Richard Edgar
(74) *Attorney, Agent, or Firm* — Dority & Manning, P.A.

(57) ABSTRACT

A wind turbine blade includes an upper shell member and a lower shell member with an internal cavity therebetween. The shell members are joined at leading and trailing edges of the blade with a bond paste along a bond line having a designed width. A sleeve is disposed within the internal cavity between the upper and lower shell members along at least one of the leading or trailing edges, with the bond paste contained within the sleeve. The sleeve has a closed end that is impermeable to the bond paste and opposite sides that are permeable to air and permeable to the bond paste. The bond past adheres to the upper and lower shell members through the sleeve sides and the closed end of the sleeve defines the design width of the bond line in the internal cavity.

20 Claims, 5 Drawing Sheets

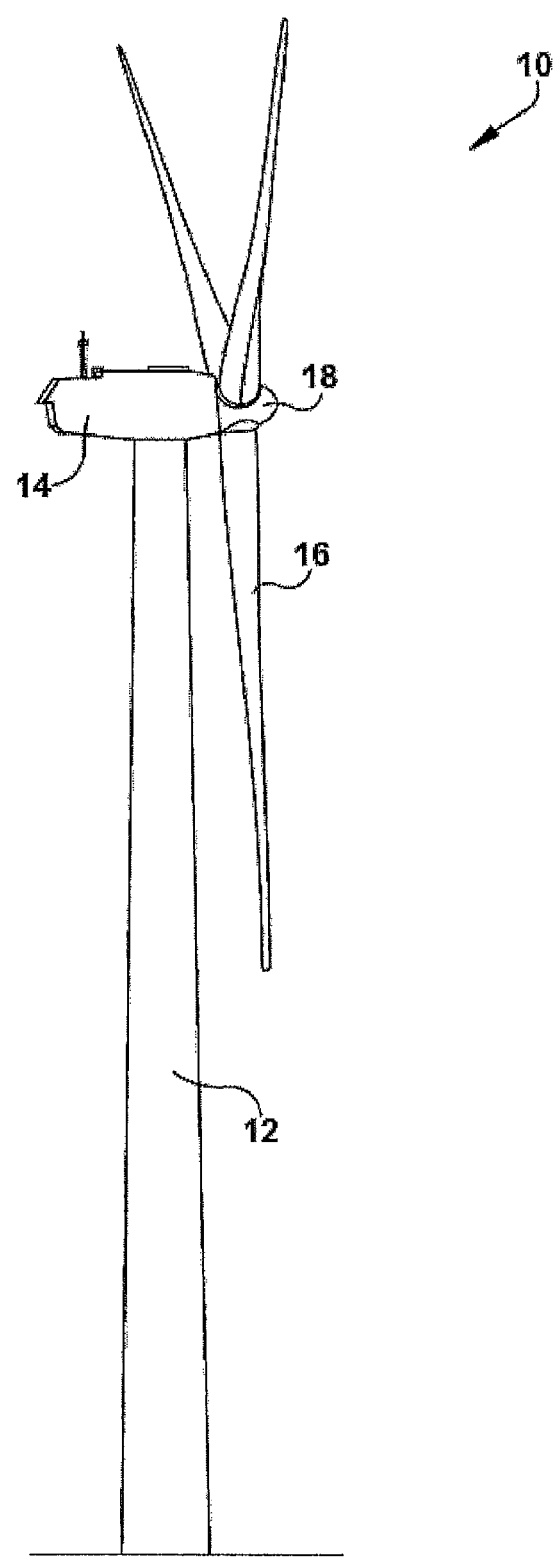
FIG. -1-

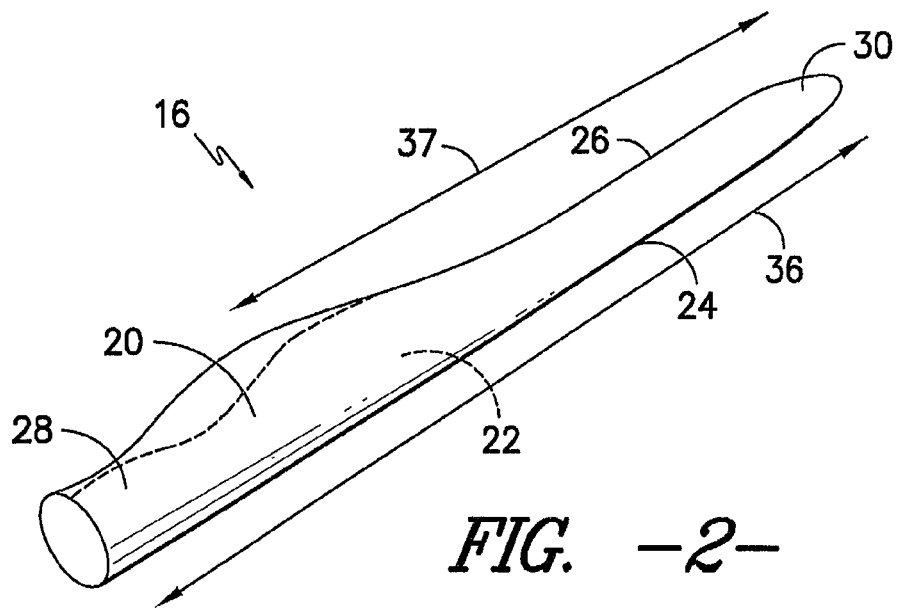
FIG. -2-
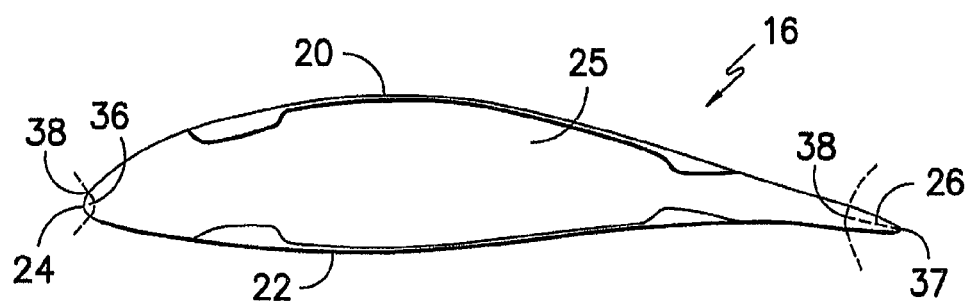
FIG. -3-
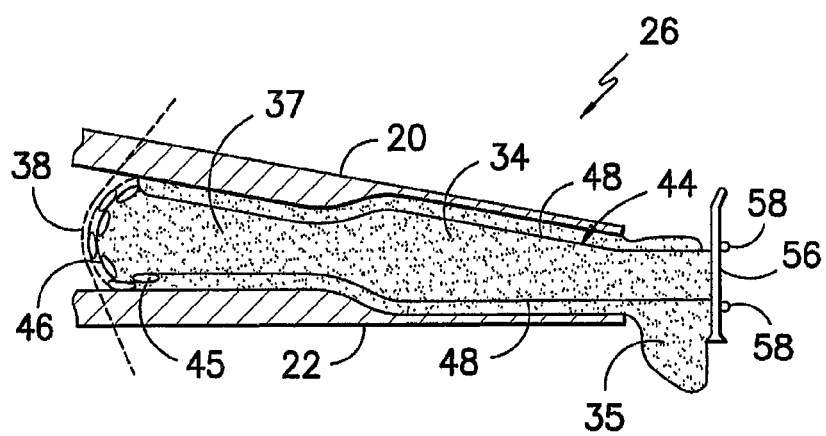
FIG. -4-

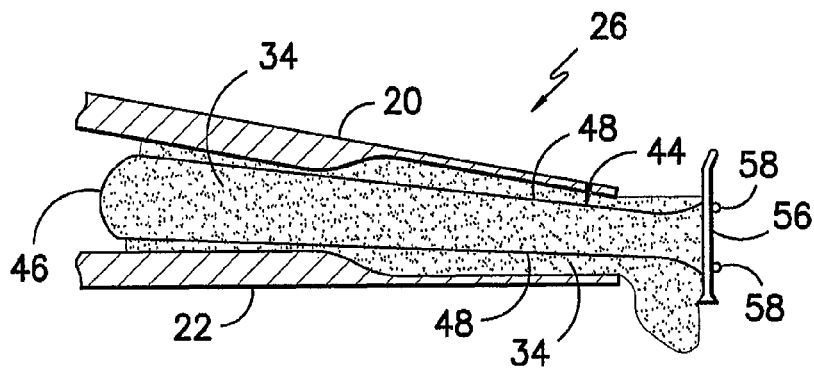
FIG. -5-
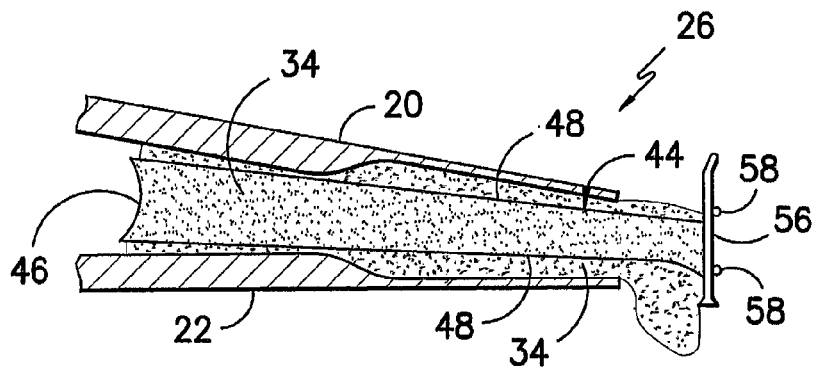
FIG. -6-
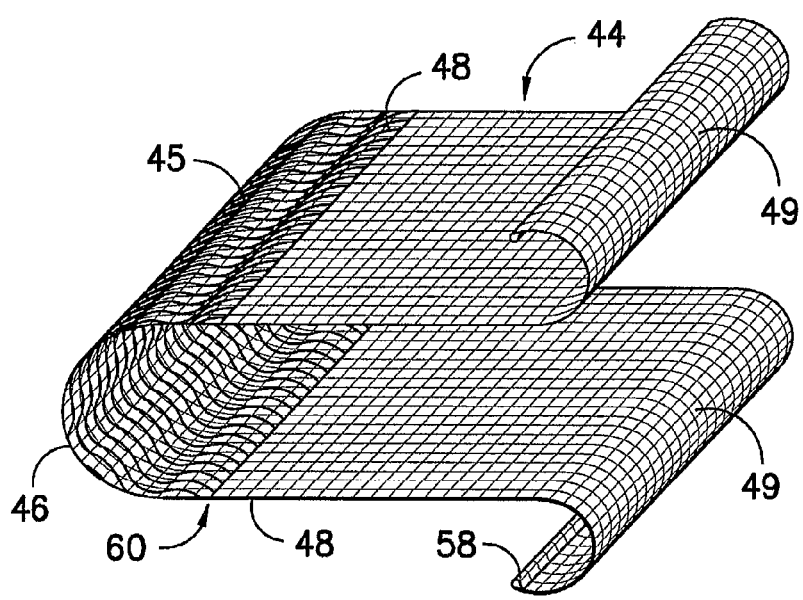
FIG. -7-

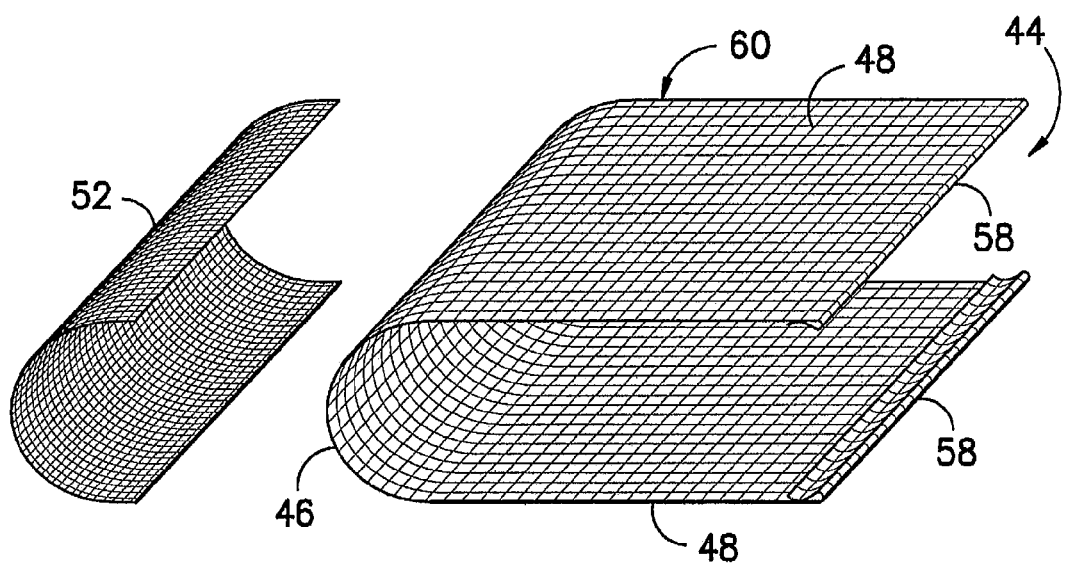
FIG. -8-
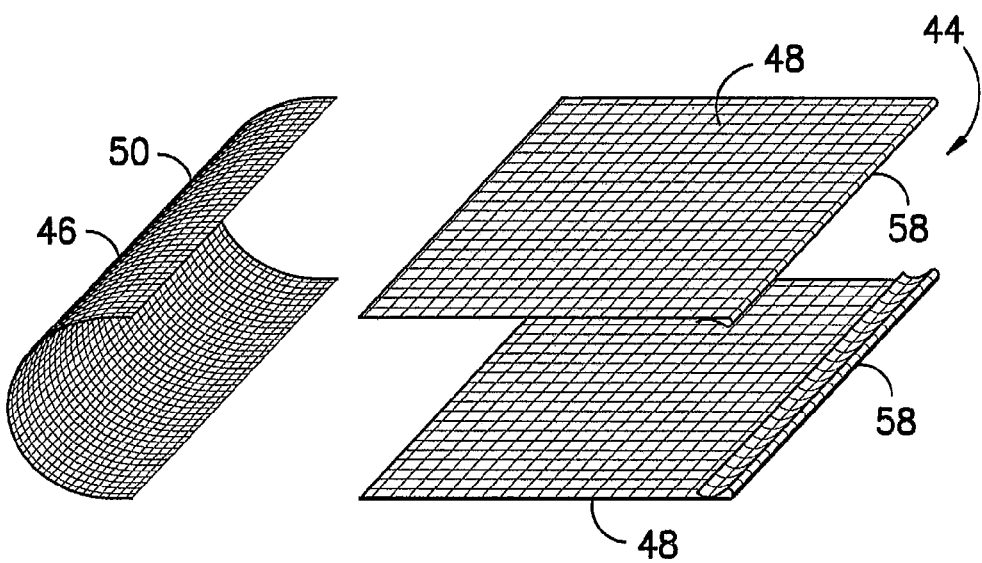
FIG. -9-

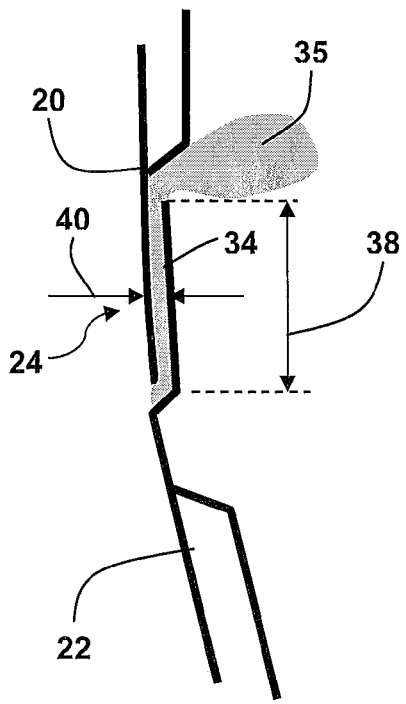 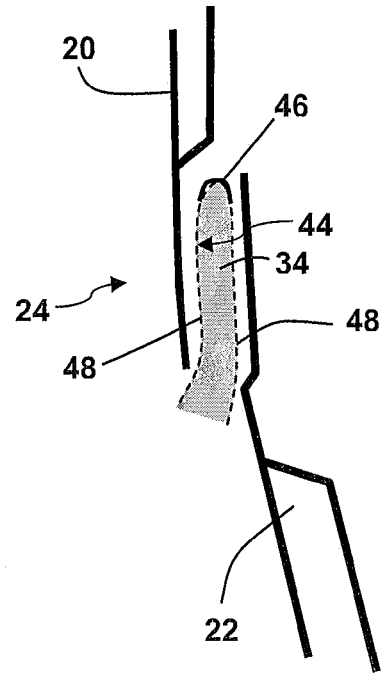
FIG. -10-    FIG. -11-
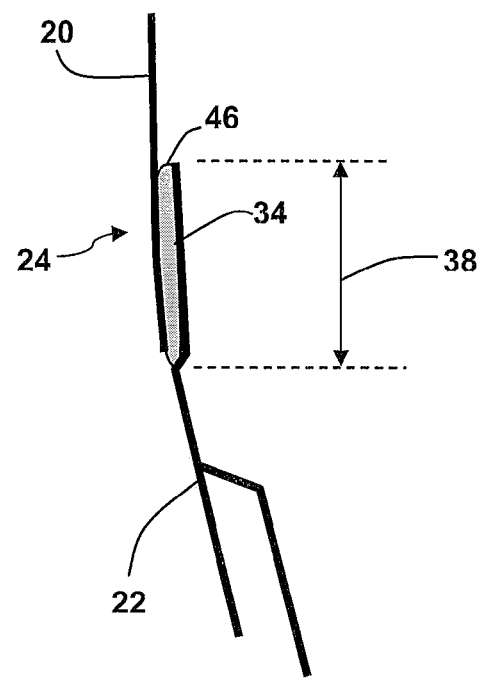
FIG. -12-

WIND TURBINE BLADES WITH IMPROVED BOND LINE AND ASSOCIATED METHOD

FIELD OF THE INVENTION

The present invention relates generally to the field of wind turbines, and more particularly to turbine blades having an improved trailing edge bond line.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell and a lower (pressure side) shell that are bonded together at bond lines along the trailing and leading edges of the blade. The bond lines are generally formed by applying a suitable bonding paste or compound along the bond line at a minimum designed bond width between the shell members. The bond paste, however, tends to migrate well past the designed bond width and into the interior blade cavity, particularly along the trailing edge of the blade. This excess bond paste can add considerable weight to the blade and, thus, adversely affect blade efficiency and overall performance of the wind turbine. The excess bond paste can also break off and cause damage to interior structure and components during operation of the wind turbine.

Accordingly, the industry would benefit from an improved bond line configuration that reduces the amount of excess bond paste that migrates into the blade cavity, particularly along the trailing edge of the turbine blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having an upper shell member and a lower shell member. The shell members define an internal cavity therebetween and are joined at leading and trailing edges of the blade with a bond paste along a bond line having a designed width. A sleeve is disposed within the internal cavity between the upper and lower shell members along at least one of the leading or trailing edges. The bond paste is contained within the sleeve. The sleeve includes a closed end that is impermeable to the bond paste (but may be permeable to air), as well as opposite sides that are permeable to air and permeable to the bond paste. With this configuration, upon joining the shell members and compressing the sleeve, the bond past migrates through the sleeve sides and bonds to the shell members. The closed end of the sleeve defines the design width of the bond line and prevents further migration of the bond paste into the internal cavity of the blade.

The present invention also encompasses various method embodiments for forming a bond between the upper and lower shell members of a wind turbine blade along at least one of the leading or trailing edges of the blade. A measured amount of a bond paste is placed into a sleeve, the sleeve having a closed end that is substantially impermeable to the bond paste and sides that are permeable to the bond paste. The sleeve is placed into one of the shell members such that the closed end extends into the shell member and the ends of the sleeve sides extend from the shell member. The sleeve ends are anchored externally of the shell members to prevent movement of the closed end relative to the shell members. In formation of the blade, the shell members are joined along the leading and trailing edges such that the sleeve is compressed between the shell members, which causes the bond paste to permeate through the sleeve sides and to bond the shell members together. The closed end of the sleeve limits migration of the bond paste into the blade past a design bond width and may allow the escape of air through the closed end.

The invention also encompasses a wind turbine having one or more turbine blades configured with the unique bond line configuration described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a wind turbine blade;

FIG. 3 is a cross-sectional view of an exemplary wind turbine blade in accordance with aspects of the invention;

FIG. 4 is an enlarged cross-sectional view of the trailing edge of a wind turbine blade in accordance with aspects of the invention;

FIG. 5 is a cross-sectional view of an alternative embodiment of a trailing edge bond configuration;

FIG. 6 is still another cross-sectional view of a different embodiment of a trailing edge bond configuration;

FIG. 7 is a perspective view of a sleeve embodiment;

FIG. 8 is a perspective view of an alternative sleeve embodiment;

FIG. 9 is a perspective view of another alternative embodiment of a sleeve;

FIG. 10 is a side cut-away view of a bond configuration at the leading edge of a wind turbine blade;

FIG. 11 is a side cut-away view of the bond configuration of FIG. 7 utilizing a sleeve in accordance with aspects of the invention; and, FIG. 12 is a side cut-away view of the embodiment of FIG. 8 in an assembled state.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a bond line 36 along the leading edge 24 and a bond line 37 at the trailing edge 26. In formation of these bond lines 36, 37, a bond paste 34 in flowable viscous form is applied between the mating laminate surfaces of the upper shell member 20 and lower shell member 22 along the length of the bond lines 36, 37. It should be appreciated that the term "bond paste" is used herein in a generic sense to encompass any type of adhesive or bonding material that is applied in an initially flowable state. The particular type of bond paste 34 is not particularly relevant to the present invention, and any suitable type of epoxy, compound, or other material may be used in this regard.

The bond paste 34 is typically applied in a sufficient quantity and pattern so as to establish a designed bond line width 38 at the leading edge 24 and bond line width 37 at the trailing edge 26 that ensures a minimum bonded surface area between the components along the length of the respective bond lines 36, 37. For example, referring to FIG. 10, the leading edge 24 of a turbine blade 26 is depicted. Bond paste 34 is applied between opposite mating laminate surfaces of the upper shell member 20 and lower shell member 22 so as to define a bond having a designed bond width 38 and bond thickness 40. The design criteria for the bond width 38 and thickness 40 may vary between different types of blades based on any combination of design factors, as is well understood by those skilled in the art.

Referring again to FIG. 10, a particular problem associated with the conventional system and method for application of the bond paste 34 is that excess bond paste is squeezed out from between the mating surfaces of the upper shell member 20 and lower shell member 22 into the internal cavity 25 (FIG. 3) and eventually cures as a hardened mass 35 that adds significant weight to the blade 16. The same problem exists at the trailing edge 26 of the blade. The excess mass bond paste 35 does not add any degree of structural integrity or other useful purpose to the blade 16.

FIGS. 4 through 6 depict a wind turbine blade 16 that utilizes a sleeve 44 disposed within the internal cavity 25 between the upper and lower shell members 20, 22 along the trailing edge 26 of the blade. A sleeve 44 may also be used at the bond line 36 along the leading edge 24, as depicted in FIGS. 10 through 12. The bond paste 34 is contained within the sleeve 44 and is prevented from migrating to any significant extent into the internal cavity 25 beyond the design bond width 38. The sleeve 44 has a closed end 46 that is substantially impermeable to the bond paste 34 and, desirably, permeable to air. Thus, upon compressing the sleeve 44 with assembly of the shell members 20, 22, air in the bond paste 34 escapes through the closed end 46, thereby reducing the likelihood of detrimental air pockets forming in the cured paste. By anchoring the sleeve 44 so that the closed end 46 is generally at the design bond width 38, as depicted in FIG. 4, the bond width 38 is readily achieved and excess bond paste 34 does not extend beyond the bond width 38.

The sleeve 44 includes sides 48 that are permeable to air and permeable to the bond paste 34. In this manner, the bond paste 34 migrates through the sides 48 upon compressing the sleeve 44 between the shell members 20, 22 and bonds to the inner surfaces of the shell members through the sleeve sides 48, as particularly depicted in FIG. 4.

It should be readily understood that the permeability of the sleeve sides 48 and closed end 46 will be a function of the viscosity of the bond paste 34 in its flowable state and, thus, may vary widely within the scope and spirit of the invention. In the embodiment of FIG. 4, the permeability of the sleeve sides 48 and viscosity of the bond paste 34 are such that the sleeve is caused to conform somewhat to the interior profile of the shell members 20, 22. A sufficient amount of the bond paste 34 still penetrates through the sleeve sides 48 to bond with the shell members 20, 22.

In the embodiment of FIG. 5, the permeability of the sleeve sides 48 and viscosity of the bond paste 34 are such that the bond paste 34 is more "flowable" through the sleeve sides as compared to the embodiment of FIG. 4. In this embodiment, the sleeve sides 48 are not caused to conform to the shell members and have an essentially straight or "flat" profile from the closed end 46 to the edge of the shell members 20, 22. With this embodiment, a greater amount of the bond paste 34 flows into the space between the sleeve 44 and shell members 20, 22 (which is exaggerated in FIGS. 5 and 6 for purposes of illustration).

The sleeve 44 may be formed of various suitable materials, or combination of materials, to achieve the desired characteristics of the closed end 46 and sides 48. For example, referring to FIGS. 4 and 7, the sleeve 44 may be formed of a common base material 60 that is an open weave mesh material having the desired permeability characteristics of the sleeve sides 48. The base material 60 may be treated or modified to define the closed end 46 that is substantially impermeable to the bond paste 34 (but may be permeable to air). For example, a coating 45 (such as a suitable resin) may be applied to the base material 60 at the closed end 46 to render the material substantially impermeable to the bond paste 34. FIG. 8 depicts an embodiment wherein an additional material layer 52 may be attached to the base material 60 at the closed end 46, with the combination of the base material 60 and additional material layer 52 providing the desired permeability profile across the closed end 46.

In still another embodiment of the sleeve 44 illustrated in FIG. 9, the sleeve sides 48 and closed end 46 are formed from different materials. For example, the sides 48 may be formed from separate pieces of an open weave mesh material that are attached to opposite sides of a different material layer 50 having the desired permeability features of the closed end 46. The material layer 50 may be, for example, a perforated film, fine mesh screen, and so forth.

The material 50 defining the closed end 46 in FIG. 9 may be a semi-rigid (or rigid) cap member having a desired preformed shaped. For example, the material 50 may be a preformed wire screen, while the sides 48 are formed from a pliant foldable material, such as an open weave cloth material.

In the embodiments of FIGS. 4 and 5, the closed end 46 is convex (curves outwardly), which may be pre-formed into a separate material 50 (FIG. 9) or additional material layer 52 (FIG. 8). Alternatively, the convex shape may simply be the result of the material weight of the bond paste 34 pushing against a pliant closed end 46 upon compressing the shell members 20, 22.

In an alternate embodiment, the closed end 46 may be formed into a stress-reducing profile that relieves stress on the sleeve at the closed end 46, such as the concave (curves inwardly) shape depicted in FIG. 6. This shape may be pre-formed into the separate material 50 or additional material layer 52. Other stress-reducing profiles are also possible.

To aid in adhesion of the sides 48 to the inner surfaces of the shell members 20, 22, it may be desired to pre-coat the sides with an adhesive resin prior to filling the sleeve 44 with the bond paste 34. This adhesive resin may be that same as (or similar to) the bond paste 34. The resin also helps to ensure that the material making up the sides 48 maintains its structural integrity during formation of the blade 16 and subsequent curing of the bond paste 34, especially for an open weave mesh material.

With still a further embodiment, it may be desired to apply a coating of adhesive resin to the inner surfaces of the shell members 20, 22 along the bond line 36, 37 of the leading and/or trailing edges 24, 26 prior to placing the sleeve 44 between the shell members. This resin may be the same as (or similar to) to the bond paste 34 and will help to adhere exposed portions or regions of the sleeve sides 48 to the shell members.

As mentioned, the sleeve 44 may be utilized along either or both of the trailing edge 26 or leading edge 24 of the blade 16. FIGS. 8 and 9 depict a sleeve 44 (containing bond paste 34) placed between overlapping laminate portions of the upper and lower shell members 20, 22 to form a bond along the leading edge 24 having a bond width 38.

The present invention also encompasses various methods for forming a bond between upper and lower shell members 20, 22 along at least one of the leading or trailing edges 24, 26 of a wind turbine blade 16. The methods include placing an amount of bond paste 34 into a sleeve 44 having a closed end 46 that is substantially impermeable to the bond paste and sides 48 that are permeable to the bond paste 34. Referring to FIG. 4, the sleeve 44 is placed into one of the shell members such that the closed end 46 extends into the shell member generally to a design width 38 of the bond line 37. The ends 58 of the sleeve 44 are formed into seams (e.g. rolled seams) and extend from the shell member at the trailing edge 26. The ends 58 are anchored, for example with an anchor rod 56 or any other suitable anchoring device, so as to prevent movement of the closed end 46 relative to the shell member 20, 22. In the embodiment of FIG. 7, the sleeve 44 has extended side portions 49 that could be anchored to the outside of the shell members 20, 22, or any other suitable location. The opposite shell member may then be placed on the shell member containing the sleeve 44 such that the sleeve 44 is compressed and the bond paste 34 permeates through the sleeve sides 48 and bonds to the shell members 20, 22 while the substantially closed end 46 of the sleeve 44 limits migration of the bond paste 34 into the blade past the design bond width 38. Desirably, the closed end 46 allows entrapped air to escape through the closed end 46.

In particular embodiments, it may be desired to initially place the sleeve beyond the design bond width 38 prior to mating the shell members, and to then subsequently pull the ends 58 of the sleeve 44 to draw the sleeve towards the trailing edge 26 (or leading edge 24) until the closed end 46 is at the design bond width 38. This step may serve to further compress the bond paste 34 into the regions of the internal cavity 25 defined by the design bond width 38 and to force air out of the closed end 46 and open end of the sleeve 44.

After sufficient curing time, any excess bond paste 35 (FIG. 4) that was squeezed out of the sleeve 44 is trimmed along the trailing edge 26 to present a finished bond between the shell members 20, 22. The amount of excess bond paste 35 may be measured and recorded, with this value being used to reduce the amount of bond paste 34 added to subsequent sleeves 44 in the formation of additional blades 16.

Any of the features discussed above with respect to the sleeve 44 or application of the sleeve within the internal cavity 25 of the blade 16 may be incorporated into the various method embodiments. For example, the method may include coating or immersing the sleeve sides 48 in an adhesive resin prior to filling the sleeve 44 with the bond paste 34. Likewise, the internal surfaces of the shell members 20, 22 may be coated with an adhesive resin prior to placement of the sleeve 44, as discussed above. The sleeve sides 48 may also be coated with a chemical that causes a local change (decrease) in the viscosity of the bond paste 34 such that a higher viscosity bond paste may be used while ensuring sufficient flow of the bond paste 34 through the sleeve sides 48.

Because the sleeve 44 defines a barrier to flow of the bond paste 34 into the internal cavity 25 of the blade 16, the present invention may provide the additional benefit that the viscosity of the bond paste 34 may be lowered or otherwise modified to ensure a more complete application and elimination of air pockets or voids between the shell members along the bond line without the concern that a more viscous paste would more readily migrate into the cavity 25.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, said blade comprising:
   an upper shell member and a lower shell member;
   said upper shell member and said lower shell member defining an internal cavity therebetween and joined at leading and trailing edges of said blade with a bond paste along a bond line having a designed width; and,
   a sleeve disposed within said internal cavity between said upper and lower shell members along at least one of said leading or trailing edges, said bond paste contained within said sleeve, said sleeve comprising a closed end that is substantially impermeable to said bond paste, said sleeve comprising opposite sides that are permeable to air and permeable to said bond paste;
   wherein said bond past adheres to said upper and lower shell members through said sleeve sides, said closed end of said sleeve defining said design width of said bond line in said internal cavity.

2. The wind turbine blade as in claim 1, wherein said sleeve sides are formed of an open weave mesh material.

3. The wind turbine blade as in claim 1, wherein said sleeve sides and said sleeve closed end are formed of different materials, said sleeve sides joined to said closed end.

4. The wind turbine blade as in claim 1, wherein said sleeve sides and said sleeve closed end are formed from a common base material, said closed end treated with a permeability reducing material.

5. The wind turbine blade as in claim 4, wherein said permeability reducing material comprises a coating applied to said base material.

6. The wind turbine blade as in claim 4, wherein said permeability reducing material comprises an additional material layer applied to said base material.

7. The wind turbine blade as in claim 1, wherein said sleeve sides are formed of an open weave mesh material having an adhesive resin applied thereto.

8. The wind turbine blade as in claim 1, wherein said sleeve closed end has a stiff, pre-formed shape and said sleeve sides are formed of a pliant material that conforms to inner contours of said upper and lower shell members.

9. The wind turbine blade as in claim 1, further comprising an adhesive resin applied to said upper and lower shell members to aid in adhering said sleeve sides to said shell members.

10. The wind turbine blade as in claim 1, wherein said sleeve is applied along said trailing edge.

11. The wind turbine blade as in claim 1, wherein said closed end of said sleeve is permeable to air.

12. The wind turbine blade as in claim 1, wherein said sleeve is initially slidable within said internal cavity against said upper and lower shell members, and is configured for being pulled towards said leading or trailing edge to bring said closed end to said design width of said bond line.

13. A method for forming a bond between upper and lower shell members along at least one of the leading or trailing edges of a wind turbine blade, said method comprising:
    placing an amount of bond paste into a sleeve, the sleeve having a closed end that is substantially impermeable to the bond paste and sides that are permeable to the bond paste;
    placing the sleeve into one of the shell members either before or after the bond paste has been placed in the sleeve such that the closed end extends into the shell member and the ends of the sleeve sides extend from the shell member;
    anchoring the sleeve ends to prevent movement of the closed end relative to the shell member; and,
    joining the shell members together along the leading and trailing edges such that the sleeve is compressed and the bond paste permeates through the sleeve sides and bonds to the shell members while the closed end of the sleeve limits migration of the bond paste into the blade past a design bond width while still allowing the escape of air through the closed end.

14. The method as in claim 13, further comprising trimming excess bond paste that migrated out from the leading or trailing edge.

15. The method as in claim 14, further comprising measuring the amount of excess bond paste trimmed from the leading or trailing edge and reducing the amount of bond paste initially placed into a subsequent sleeve by the measured amount of trimmed bond paste.

16. The method as in claim 13, wherein the sleeve is applied along the trailing edge.

17. The method as in claim 13, further comprising applying an adhesive resin to the sleeve sides.

18. The method as in claim 13, further comprising applying an adhesive resin to the upper and lower shell members to further aid in attachment of the sleeve sides to the shell members.

19. The method as in claim 13, further comprising forming the closed end of the sleeve into a stiff, pre-formed shape prior to placing the bond paste into the sleeve.

20. The method as in claim 13, further comprising initially placing the sleeve between the shell members such that the closed end extends beyond the design bond width and pulling the sleeve towards the leading or trailing edge to bring the closed end to the design bond width prior to anchoring the sleeve ends.

\* \* \* \* \*